(12) United States Patent
Michaud et al.

(10) Patent No.: US 7,677,503 B2
(45) Date of Patent: Mar. 16, 2010

(54) REWORK BRACKET FOR ELECTRICAL OUTLET BOXES

(75) Inventors: Alain Michaud, St. Jean-sur-Richelieu (CA); Michael DiLillo, LaPrairie (CA)

(73) Assignee: Thomas & Betts International, Inc., Wilmington, DE (US)

( * ) Notice: Subject to any disclaimer, the term of this patent is extended or adjusted under 35 U.S.C. 154(b) by 561 days.

(21) Appl. No.: 11/642,613

(22) Filed: Dec. 20, 2006

(65) Prior Publication Data

US 2007/0164183 A1 Jul. 19, 2007

Related U.S. Application Data

(60) Provisional application No. 60/755,275, filed on Dec. 30, 2005.

(51) Int. Cl.
*G12B 9/00* (2006.01)

(52) U.S. Cl. .................. 248/27.1; 248/231.9; 248/300; 248/906

(58) Field of Classification Search .............. 248/27.1, 248/27.3, 300, 906, 231.9; 220/3.5, 3.6; 439/538, 560
See application file for complete search history.

(56) References Cited

U.S. PATENT DOCUMENTS

| | | | | |
|---|---|---|---|---|
| 1,246,741 A | * | 11/1917 | Hancock et al | 220/3.4 |
| 1,814,449 A | * | 7/1931 | Morgenstern | 220/3.9 |
| 2,299,674 A | * | 10/1942 | Austin, Jr. | 248/311.2 |
| 2,448,359 A | | 8/1948 | Davison | |
| 2,451,267 A | * | 10/1948 | Wilder | 174/480 |
| 2,454,119 A | | 11/1948 | Atkinson | |
| 2,456,450 A | | 12/1948 | Sauter | |
| 2,514,176 A | * | 7/1950 | Borkowski | 248/27.1 |
| 2,586,728 A | | 2/1952 | Shepard | |
| 2,751,173 A | * | 6/1956 | Fredriksen | 248/27.1 |
| 2,800,698 A | | 7/1957 | Wood | |
| 2,842,281 A | | 7/1958 | Chisholm | |
| 3,115,265 A | * | 12/1963 | Mulkey et al. | 220/3.5 |
| 3,184,191 A | | 5/1965 | Esoldi | |
| 3,268,189 A | | 8/1966 | Ducharme | |
| 3,424,332 A | | 1/1969 | Pimentel | |
| 3,428,284 A | * | 2/1969 | Kreuzer et al. | 248/216.1 |
| 3,928,716 A | * | 12/1975 | Marrero | 174/57 |
| 4,108,414 A | * | 8/1978 | Grant, Sr. | 248/300 |
| 4,180,226 A | | 12/1979 | Matte | |
| 4,183,486 A | | 1/1980 | Esoldi | |
| 4,483,453 A | * | 11/1984 | Smolik | 220/3.5 |
| 4,693,438 A | | 9/1987 | Angell | |

(Continued)

*Primary Examiner*—Korie Chan
(74) *Attorney, Agent, or Firm*—Hoffmann & Baron, LLP

(57) ABSTRACT

A bracket for electrical outlet boxes that includes: a first end section, a middle section and a second end section, wherein each section has a substantially planar surface, a first side, a second side, a top surface and a bottom surface, wherein the middle section is offset from and substantially parallel to the first and second end sections; first and second offset portions connecting the middle section to the first and second end sections; first and second opposing ends extending upwardly and substantially perpendicular to the first and second end sections; a first tab and a second tab extending in opposing relation to each other from the first side of the first and second ends; a first leg and a second leg extending downwardly from the second side of the first and second end sections; and a bendable member extending from the first side of the middle section.

25 Claims, 13 Drawing Sheets

U.S. PATENT DOCUMENTS

| | | |
|---|---|---|
| 4,892,212 A | 1/1990 | Andreyko |
| 4,955,825 A | 9/1990 | Groth et al. |
| D363,875 S * | 11/1995 | Korb .......................... D8/373 |
| 6,766,992 B1 * | 7/2004 | Parker ........................ 248/300 |
| 7,157,643 B2 * | 1/2007 | Drane ......................... 174/66 |

* cited by examiner

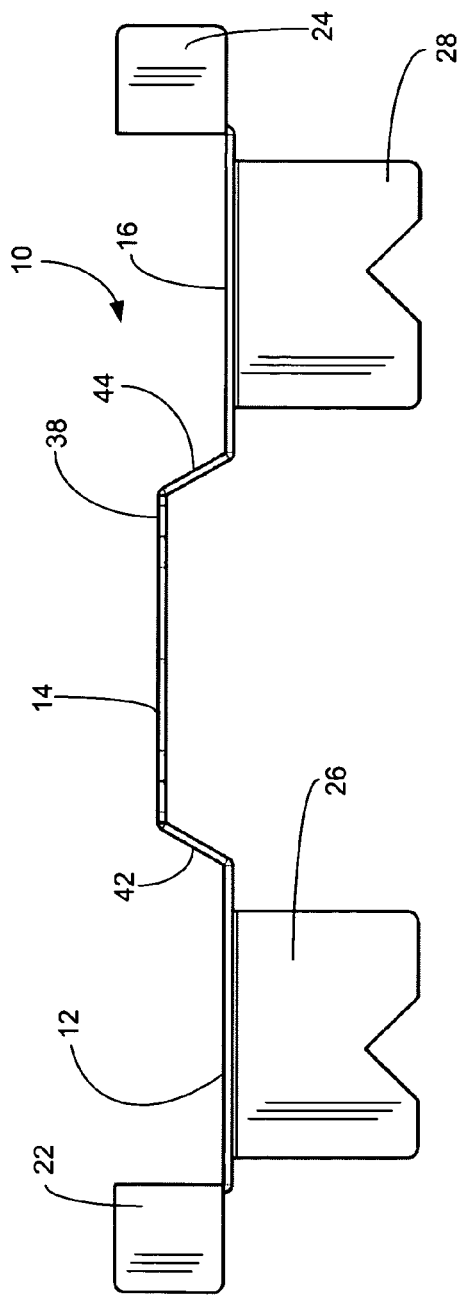
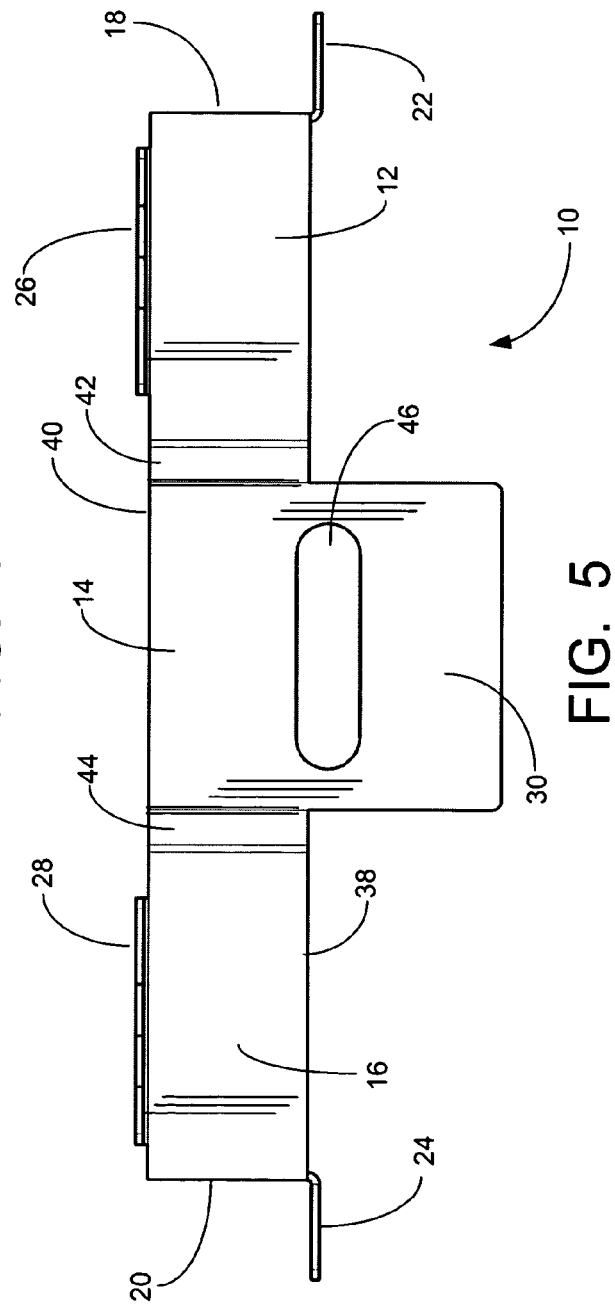
FIG. 4
FIG. 5

REWORK BRACKET FOR ELECTRICAL OUTLET BOXES

This application claims priority from provisional application Ser. No. 60/755,275, filed on Dec. 30, 2005, which is incorporated herein in its entirety.

FIELD OF THE INVENTION

The present invention relates to brackets used to install electrical outlet boxes in a wall. In particular, the invention relates to brackets that are used to install electrical outlet boxes in existing walls.

BACKGROUND OF INVENTION

The use of electrical outlet boxes for housing electrical devices and connecting wires is well known in the art. In new construction, the boxes are typically attached to wall studs using screws or nails prior to placement of the wall on the studs. Conventional fasteners may be used in these situations to mount the boxes to the wall studs. In many cases, the outlet boxes include tabs or apertures for mounting the boxes. However, when electrical boxes are installed in existing walls, such as when renovating or remodeling, the wall studs are not always readily accessible or in the desired location to permit easy installation of the electrical boxes. These situations require the use of "cut-in" or "old work" electrical boxes, which do not have to be attached to a stud or support member.

"Cut-in" or "old work" boxes, are used where the boxes are inserted into an opening cut into the wall. The boxes are specifically constructed to include clamping hardware, which enables the box to be clamped to the wall about the opening without regard to the location of the wall studs. These cut-in or old work boxes have a variety of designs and many of them use a bracket or similar type of mounting hardware to secure the box to the wall.

"Cut-in" or "old work" boxes generally take two forms. The first includes boxes having swing-out clips. Examples of boxes of this type are shown in U.S. Pat. Nos. 4,332,330, 2,299,696, 2,272,846 and 1,957,844. The boxes shown in these patents include adjustable clips mounted on each box side wall. The clips are initially positioned inside the outer perimeter of the box so that the box may be inserted into an opening in the wall which is sized to specifically accommodate the box. After the clips pass through the opening, they may be swung outwardly to engage the back surface of the wall. These swing-out clips, however, are difficult to manipulate in the tight environment in which these boxes must be installed. Further, the box must include passageways or slots through the side wall of the box to enable the clip to swing out from an internal position to an external position once the box is inserted through the wall opening. As may be appreciated, boxes having swing-out clips of this type require extensive fabrication and/or modification of an existing box structure. Due to such extensive modification, many of these types of cut-in boxes are not listed by agencies such as Underwriters Laboratories (UL) and Canadian Standards Association (CSA).

Another type of cut-in box includes those boxes which have clips and screws mounted on the exterior surface of the side walls or the top and bottom walls of the box. Examples of boxes of this type are shown in U.S. Pat. Nos. 2,867,344, 2,801,019, 1,957,003 and 1,775,665. As the clips shown in these patents are mounted exteriorly of the box, they present a wide profile which requires a larger hole to be cut through the wall into which the box is to be mounted. Such a large opening may require extensive wall repair after the box is installed or must be used with a large cover plate to cover the opening.

Also, many of these boxes include complicated wall engaging mounting structures. Compression devices, toggle clips, snaps and the like such as shown in U.S. Pat. Nos. 4,120,473, 4,120,416, 2,776,774, 2,870,931 and 2,769,562 may also be used to secure the box to the wall. However many of these structures are difficult for the installer to easily operate.

Common to all of the above described boxes, is the fact that the boxes must be prefabricated or specifically modified to accommodate particular mounting hardware. This necessitates the installer carrying boxes which are specifically manufactured solely for old work or cut-in applications in addition to boxes for other applications.

Therefore, it is desirable to provide a mounting bracket which allows for the use of a standard electrical box in old work or cut-in applications.

SUMMARY OF THE INVENTION

In accordance with the present invention, a bracket for an electrical outlet box is provided. The bracket includes a first end section, a middle section and a second end section. Each section has a first side, a second side, a top surface and a bottom surface. The end sections have substantially planar surfaces and the top surface of the middle section is offset from, and preferably substantially parallel to, the top surfaces of the first and second end sections. Preferably, the middle section is substantially planar and is offset from the first end section by the first offset portion and from the second end section by the second offset portion. In another embodiment, the middle section is arcuately shaped and directly connected to the first and second end sections, or connected by the first and second offset portions. Preferably, the surfaces of the first and second end sections are in substantially the same plane. The middle section can include a bendable member that extends from the first side of the middle section in substantially the same plane as the middle section and the bendable member can have an aperture. In one embodiment, the bendable member extends outwardly from the first side of the middle section and upwardly in relation to the top surface of the middle section. In this embodiment, the middle section includes one or more tangs, which extend outwardly from the top surface and can engage, preferably in a flexible manner, the outside wall of an electrical outlet box.

The bracket also includes first and second opposing ends which extend upwardly and substantially perpendicular to the top surfaces of the first and second end sections. The opposing ends have first and second sides which correspond to the first and second sides of the first, second and middle sections. A first tab and a second tab extend in opposing relation to each other from the first side of the first and second end sections. In addition, a first leg and a second leg extend downwardly from the second side of the bottom surfaces of the first and second end sections to a first and a second bottom edge, respectively. Preferably, the first and second legs are substantially flat and each of the first and second bottom edges comprises a notch. In preferred embodiments, the first and second legs extend downwardly along more than one half of the first and second lengths of the first and second end sections.

The bracket can be made from non-ferrous or steel sheet metal and, preferably, is made as a unitary construction, that is, the bracket is fabricated from a single piece of sheet metal. The preferred method of fabrication is by a stamping process, which forms the bracket (i.e., cuts out the shape of the bracket from a piece of sheet metal) in a single operation and then shapes the bracket (i.e., bends the different sections) in subsequent operations.

The preferred embodiments of the bracket of the present invention, as well as other objects, features and advantages of this invention, will be apparent from the following detailed description, which is to be read in conjunction with the accompanying drawings.

BRIEF DESCRIPTION OF THE FIGURES

Other objects and many attendant features of this invention will be readily appreciated as the invention becomes better understood by reference to the following detailed description when considered in connection with the accompanying drawings wherein:

FIG. 4 is a side view of the first side of the rework bracket.
FIG. 5 is a bottom view of the rework bracket.

DETAILED DESCRIPTION OF THE INVENTION

Figure 1:
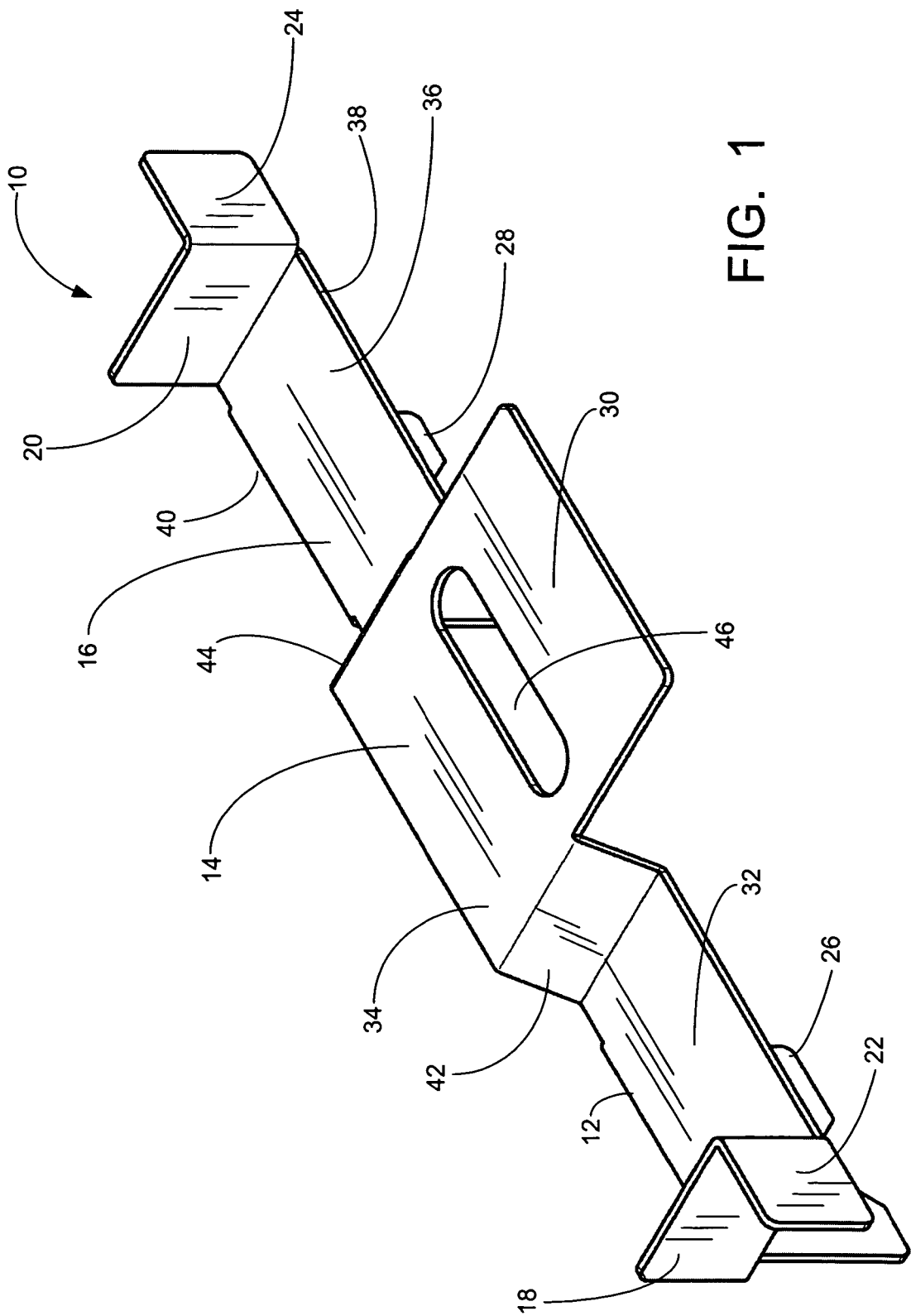
FIG. 1 is a top perspective view of the rework bracket.

The present invention is a bracket for mounting an electrical outlet box in an existing wall, typically, a wall made of drywall, i.e., gypsum board. However, the invention is not limited to drywall and the bracket can be used for mounting electrical outlet boxes in walls made of any material, including wood and synthetic materials. The brackets are designed to be used in pairs, with one bracket on each side of an outlet box. The brackets hold the outlet box in position and prevent it from falling through the opening in the wall. Moreover, the brackets allow the outlet box to be permanently mounted without having to use adhesives, screws or fasteners.

The brackets have a first end section, a middle section and a second end section. In one embodiment, all three sections are substantially flat and are, preferably, longer than they are wide. In another embodiment, the first and second end sections are substantially flat and the middle section is arcuately shaped. Each section has a top and a bottom surface and a first and a second side. The middle section can be offset from the top surfaces of the first and second end sections. In a preferred embodiment, the top surface of the middle section is substantially parallel to the top surfaces of the two end sections, which are in substantially the same plane. The brackets also have a first end and a second end, which have first and second sides that correspond to the first and second sides of the first, second and middles sections and which extend away from and substantially perpendicular to the top surfaces of the first and second end sections, respectively. The ends have a tab which extends perpendicularly from the first side of the first and second ends in opposing relation to each other so that each tab extends away from the middle section.

The bracket also includes a pair of legs with first and second bottom edges, which extend downwardly from the second side of the first and second end sections and substantially perpendicular to them. The first and second bottom edges of the legs can include a notch, preferably a V-shaped notch, that is adapted to receive a mounting screw or nail. This notch is only used when the installer can access the rear of the wall. In most applications, the rear of the wall is not accessible and, therefore, the notch is not used. A bendable member extends outwardly from the first side of the middle section and it is designed to engage the bracket with the outlet box. After a pair of brackets are installed in an opening in a wall, the outlet box is inserted between the brackets and the bendable members of the brackets are folded into the interior of the outlet box to secure the box to the wall.

Preferably, the brackets are installed in a rectangular opening (also referred to as a "cut-out") that is cut into an existing wall. However, openings having other shapes are also contemplated and are within the scope of the invention. The size of the cut-out depends on the type of electrical outlet box that is used. A variety of different size brackets are contemplated by the present invention, which can accommodate different size outlet boxes. Typically, the electrical outlet boxes are singular or duplex boxes, but the invention is not limited to such boxes and the dimensions of the brackets can be changed to accommodate any size outlet box. For example, the dimensions of the wall cutout for a single outlet box are approximately 3⅜ inches by 2¼ inches. The thickness of the wall can also vary and the dimensions of the bracket can be changed to accommodate any thickness. For example, when the bracket is used with drywall, the thickness of the wall is preferably between ⅜ inch and 1½ inches and an installer selects a bracket having a distance between the sides of the first, second and middle sections with corresponding dimensions.

The installation of an electrical outlet box in an existing wall begins with the selection of the location for the box. After a substantially rectangular opening in the wall is cut-out, a pair of brackets are inserted through the opening so that the surfaces of the three sections are parallel to the vertical edges of the cut-out. The brackets are symmetrical so that the same bracket can be used on the left and right side of the outlet box by rotating one of the brackets so that the positions of the opposing ends are exchanged. Each bracket is then oriented so that the middle sections are offset away from the opposing vertical edges of the cut-out. The legs are parallel to the surface of the wall and pass through the opening when the bracket is inserted. For each bracket, the first and second end sections are closer to the vertical edges of the cut-out than the middle sections and, after the legs pass through the cut-out, the tabs contact the exterior surface of the wall above and below the horizontal edges of the cut-out. The brackets are then moved laterally towards the opposing vertical edges of the opening so that the end sections contact the vertical edges of the cutout. At the same time, the legs of each bracket slide under and contact the back surface of the wall on opposing sides of the cut-out.

After the pair of brackets are installed in the opening in the wall, the bendable members of the brackets extend away from the exterior surface of the wall. An electrical outlet box is inserted between the two brackets and the exterior vertical walls of the outlet box contact the middle section of each bracket. The offset middle section is flexibly disposed between the two end sections and provides a spring-like effect. This allows the outlet box to be snugly secured between the two brackets. The outlet box is pushed through the opening until the front of the box is substantially flush with the exterior surface of the wall. A properly sized opening in a wall enables the two brackets to engage the opposing sides of the outlet box and hold it in place. The bendable members of each of the brackets are then bent inwardly through the front opening of the box until they contact the surfaces of the opposing interior side walls of the outlet box and secure the box in place.

In another embodiment, the middle section is not offset from the first and second end sections and the bendable member extends outwardly and upwardly from the first side of the middle section. In this embodiment, the middle section includes one or more tangs, which are preferable formed when the bracket is formed using a metal stamping method. Typically, the tangs are formed by stamping a U-shaped aperture in the middle section and bending the metal section between the two legs of the U outwardly from the top surface of the middle section. When the bracket is installed in a wall, the tangs flexibly engage the outside wall of the electrical outlet box to secure it in place. The bendable member is then folded into the electrical box to further secure it to the wall. In preferred embodiments, the bendable member is L-shaped and the first leg of the L extends outwardly from the first side of the middle section. The second leg of the L then extends upwardly and substantially perpendicular to the top surface of the middle section. The aperture in the bendable member is located in the second leg of the L and facilitates bending the end of the bendable member over the side wall of the electrical box.

The brackets are preferably formed from a sheet of metal which is cut and bent to create the different parts of the bracket using methods well known in the art, most preferably a metal stamping process. Typically, the sheet metal is a non-ferrous or carbon steel, but other metals can be used and those skilled in the art of metal working are familiar with the types of metals that are suitable for forming such brackets. The brackets can also be made of a thermoplastic material by various methods such as extrusion, injection or cast molding.

FIG. 1 shows a bracket 10 for an electrical outlet box that includes a first side 38 and a second side 40 and three sections: a first end section 12, a middle section 14 and a second end section 16. Each of the three sections 12, 14, 16 has a substantially planar surface 32, 34, 36. The middle section 14 is offset from and the first and second end sections 12, 16 by offset portions 42, 44 so that the surface 34 of the middle section 14 is substantially parallel to the surfaces 32, 36 of the two end sections 12, 16. Surfaces 32, 36 are generally coplanar.

A first end 18 and a second end 20 extend upwardly and substantially perpendicular to the first and second end sections 12, 16, respectively, in the same direction as the offset middle section 14, i.e., both the middle section 14 and the ends 18, 20 extend away from the top surface of the first and second end sections 12, 16. A first tab 22 and a second tab 24 extend in opposing relation to each other from the first side 38 of the first and second end sections 12, 16, respectively, and away from the middle section 14. A first leg 26 and a second leg 28 extend from the second side 40 of the first and second end sections 12, 16, respectively, in a direction that is substantially perpendicular to the bottom surfaces of the first and second end sections 12, 16, and in a direction opposite to the offset middle section 14. A bendable member 30 extends outwardly from the first side 38 of the middle section 14 and it can include an aperture 46 to facilitate bending the member 30. Other methods known to those skilled in the art, such as score line or weakened section, may be included to facilitate bending the member 30.

Figure 2:
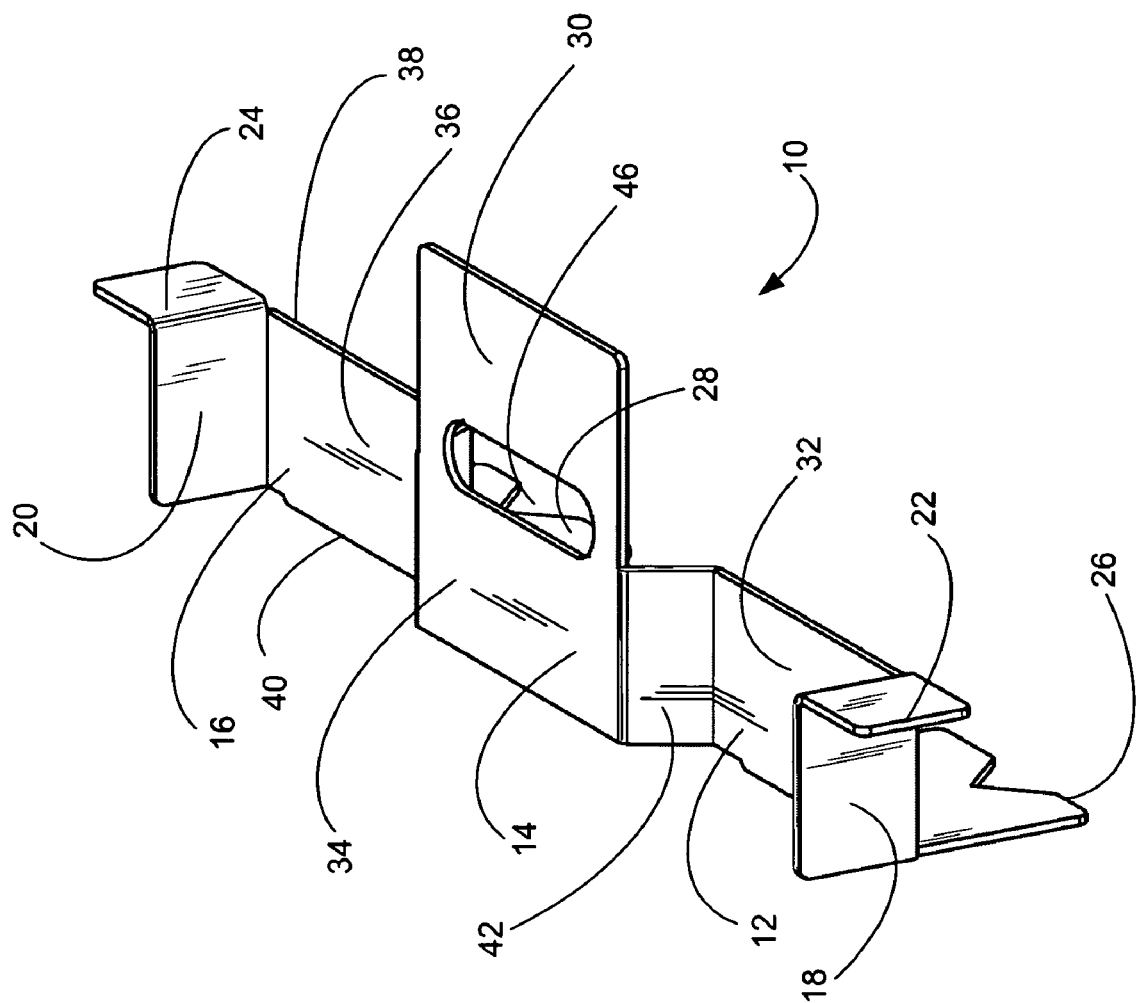
FIG. 2 is a side perspective view of the rework bracket.

FIG. 2 shows the tabs 22, 24 on opposing ends of the bracket 10. When the bracket 10 is installed in an opening in a wall, it is oriented so that the ends 18, 20 are vertically disposed, i.e., at the top and bottom. The second side 40 of the bracket 10 with legs 26, 28 extending therefrom is passed through the opening until the tabs 22, 24 contact the exterior surface of the wall (i.e., the side of the wall from which the device in the outlet box will be accessed) above and below the opening in the wall. The bracket 10 is then moved laterally so that the legs 26, 28 are positioned under and in contact with the interior surface of the wall (i.e., the back side of the wall which is hidden from view) and the end sections 12, 16 contact the vertical edge of the wall opening. The bracket 10 is symmetrical so that the same bracket 10 can be installed in the opposing sides of an opening by rotating the ends so that tab 22 contacts the wall above the opening on one side and below the opening on the other side. In both instances, the offset middle sections 14 of the bracket 10 are positioned so that they extend towards each other and away from the opposing vertical edges of the opening in the wall.

Figure 3:
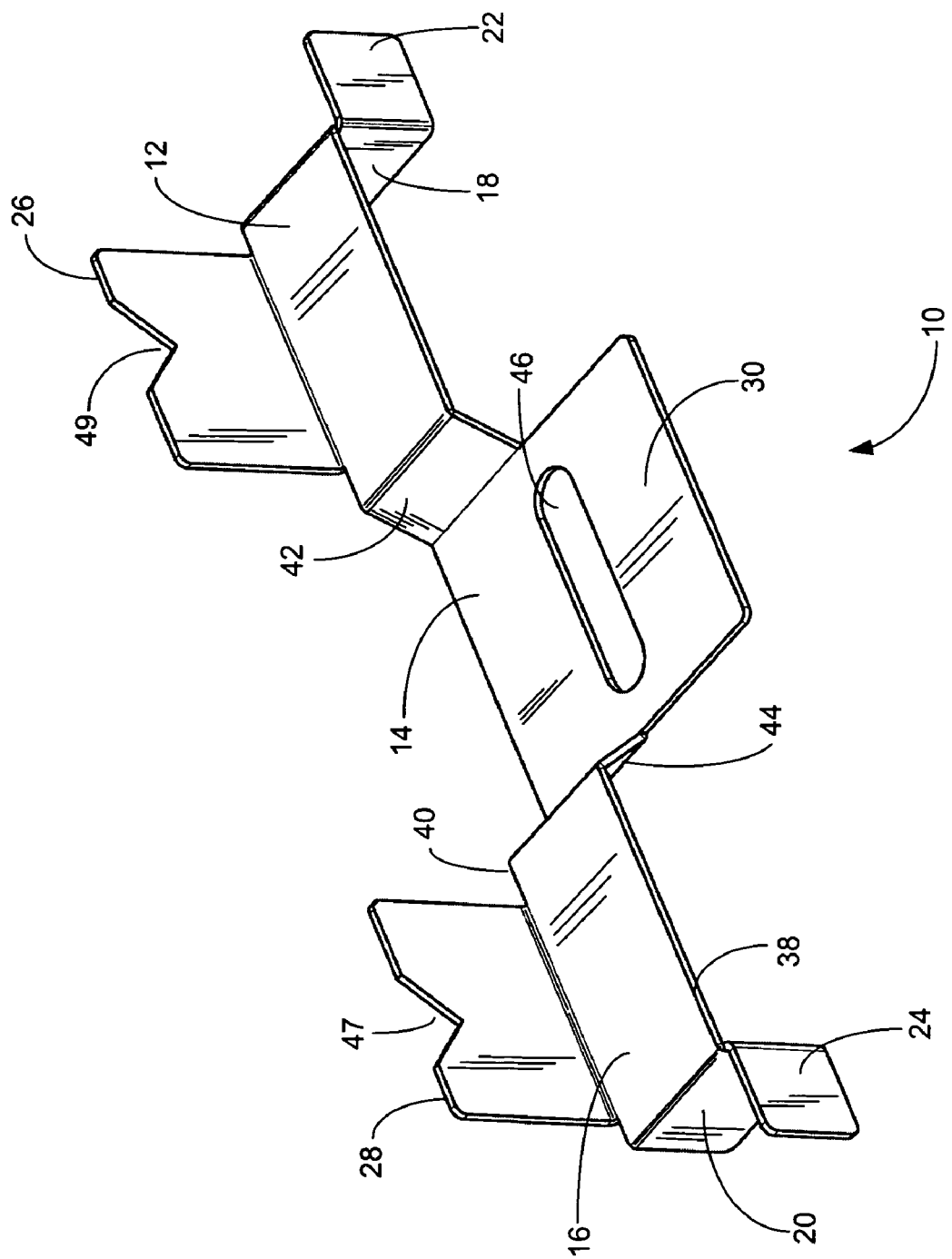
FIG. 3 is a bottom perspective view of the rework bracket.

FIG. 3 shows the rework bracket 10 with legs 26, 28 which extend from the two end sections 12, 16, respectively. The legs 26, 28 can have notches 47, 49 at the bottom edges, which can be used for securing the bracket 10 to a wall. The middle section 14 is offset from the end sections 12, 16 by the offset portions 42, 44. Preferably, the offset portions 42, 44 form angles of between 30 and 60 degrees with the end sections 12, 16 and the middle section 14, most preferably an angle of about 45 degrees. In addition, the bendable member 30 can have an aperture 46 to facilitate bending.

FIG. 4 is a side view of the first side 38 of the rework bracket 10 with legs 26, 28 extending downwardly from the opposite side (i.e., the second side which is not shown) of end sections 12, 16, respectively. Preferably, the legs 26, 28 are substantially flat and extend downwardly from along at least half of the length of the second side edges 40 of the end sections 12, 16, more preferably from substantially the entire second side edges 40 of the two sections 12, 16. Tabs 22, 24 are shown extending outwardly from the ends 18, 20 respectively, and away from the middle section 14. Preferably, the tabs 22, 24 are substantially flat in substantially the same plane. Moreover, the planes formed by the legs 26, 28 and the tabs 22, 24 are substantially parallel to each other and substantially perpendicular to the surfaces of the first, second and middle sections 12, 16, 14. FIG. 4 also shows middle section 14 is offset from the end sections 12, 16 by offset portions 42, 44, wherein the plane formed by each of the offset portions 42, 44 intersects the planes of the first, second and middle sections 12, 16, 14 at an angle of about 45 degrees.

FIG. 5 is a bottom view of the rework bracket 10 and shows the middle section 14 and two end sections 12, 16 of the bracket 10. The figure shows the bendable member 30 with aperture 46 and tabs 22, 24 extending from the first side 38 of the bracket 10 and the legs 26, 28 extending from the second side 40. Preferably, the aperture 46 is positioned so that the side of the aperture 46 next to the middle section 14 is approximately aligned with the first side 38 of the first and second end sections 12, 16. When the bendable member 30 is folded over, it preferably does not extend beyond the first side 38 of the first and second end sections 12, 16.

Figure 6:
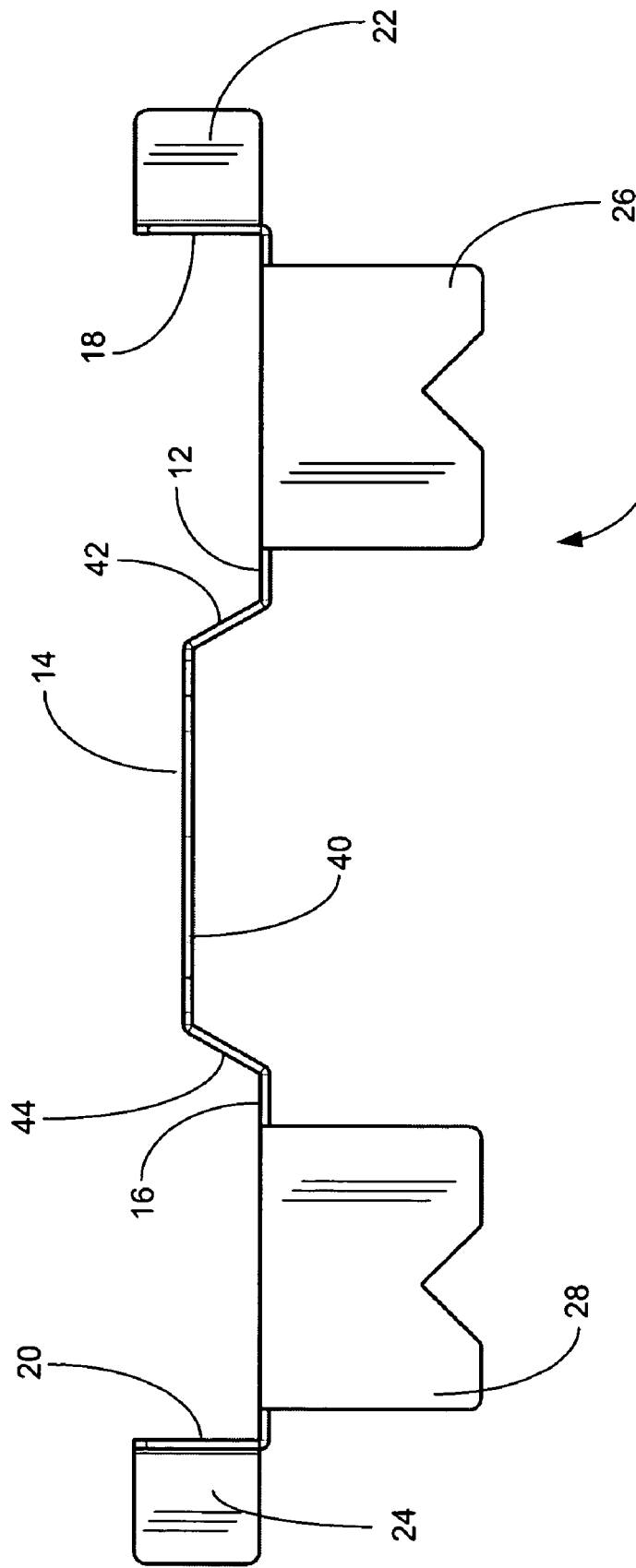
FIG. 6 is a side view of the second side of the rework bracket.

FIG. 6 is a side view of the second side 40 of the rework bracket 10 which shows the tabs 22, 24 extending outwardly from the opposing ends 18, 20 of the bracket 10. The first end section 12 is defined by the first end 18 and the first offset portion 42. The second end section 16 is defined by the second end 20 and the second offset portion 44.

Figure 7:
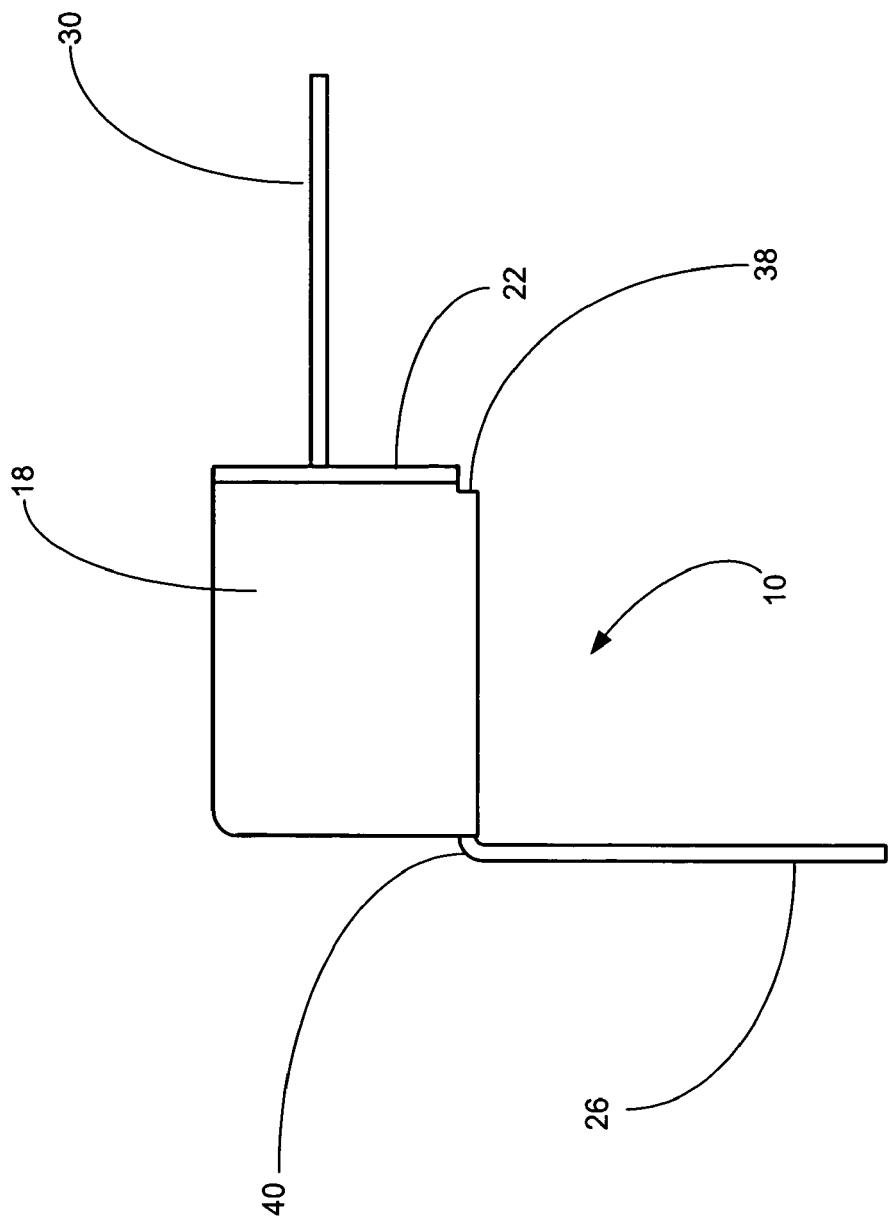
FIG. 7 is an end view of the rework bracket.

FIG. 7 is an end view of the first end 18 of the rework bracket 10. Tab 22 extends substantially perpendicularly from the first side 38 of the first end 18 and bendable member 30 extends outwardly from the first side 38 of the middle section 16 (see FIG. 1). Leg 26 extends downwardly from the second side 40 of the bracket 10.

Figure 8:
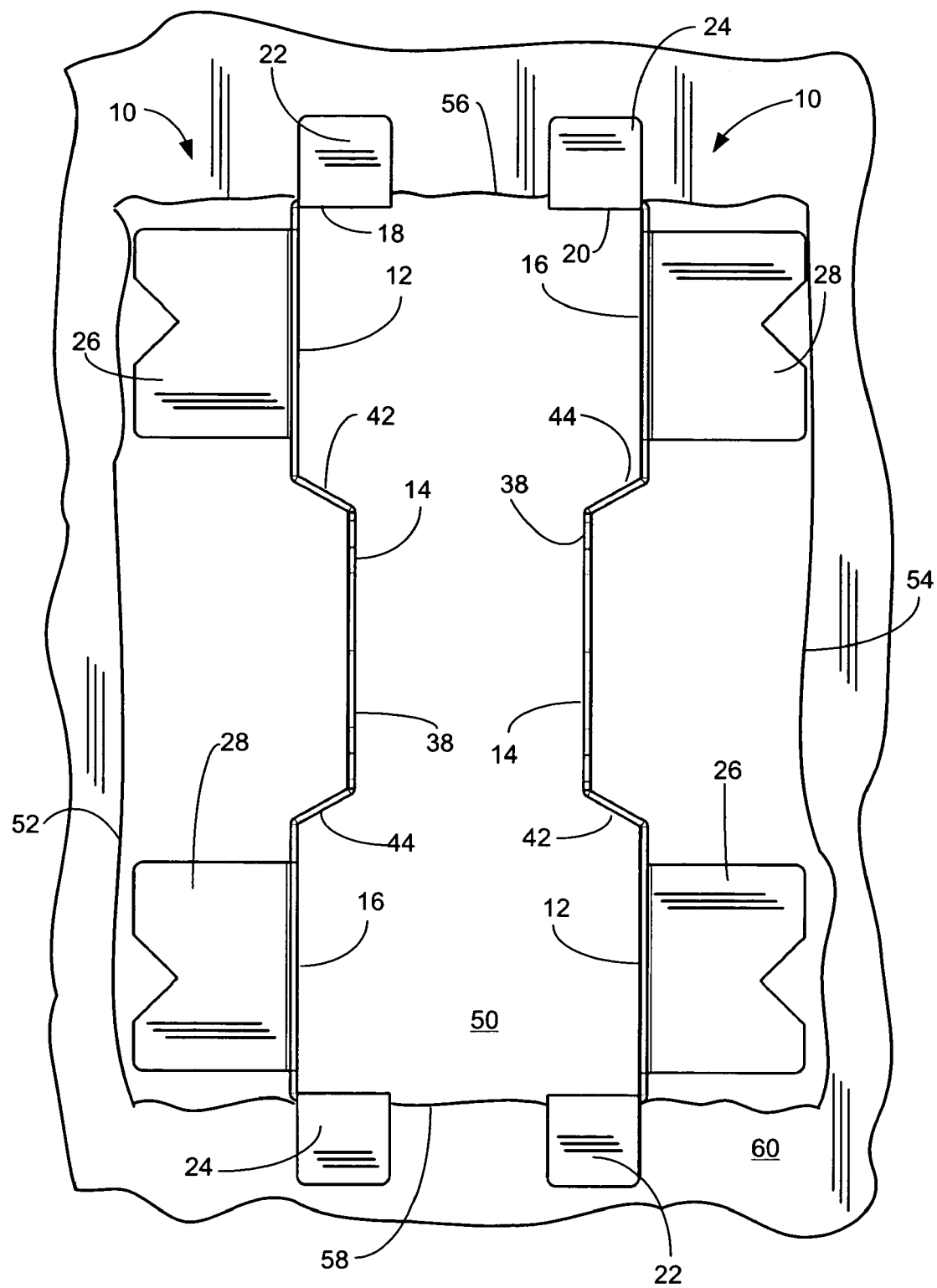
FIG. 8 shows a pair of rework brackets prior to insertion through an opening.

FIG. 8 shows a pair of rework brackets 10 prior to insertion into an opening 50 in a wall 60. The tabs 22, 24 are positioned over the wall 60 above the opening 50 and the legs 26, 28 are positioned in or through the opening 50 and oriented so that they extend toward the opposing vertical edges 52, 54 of the opening 50. The offset middle sections 14 face away from the opposing vertical edges 52, 54 of the opening 50.

Figure 9:
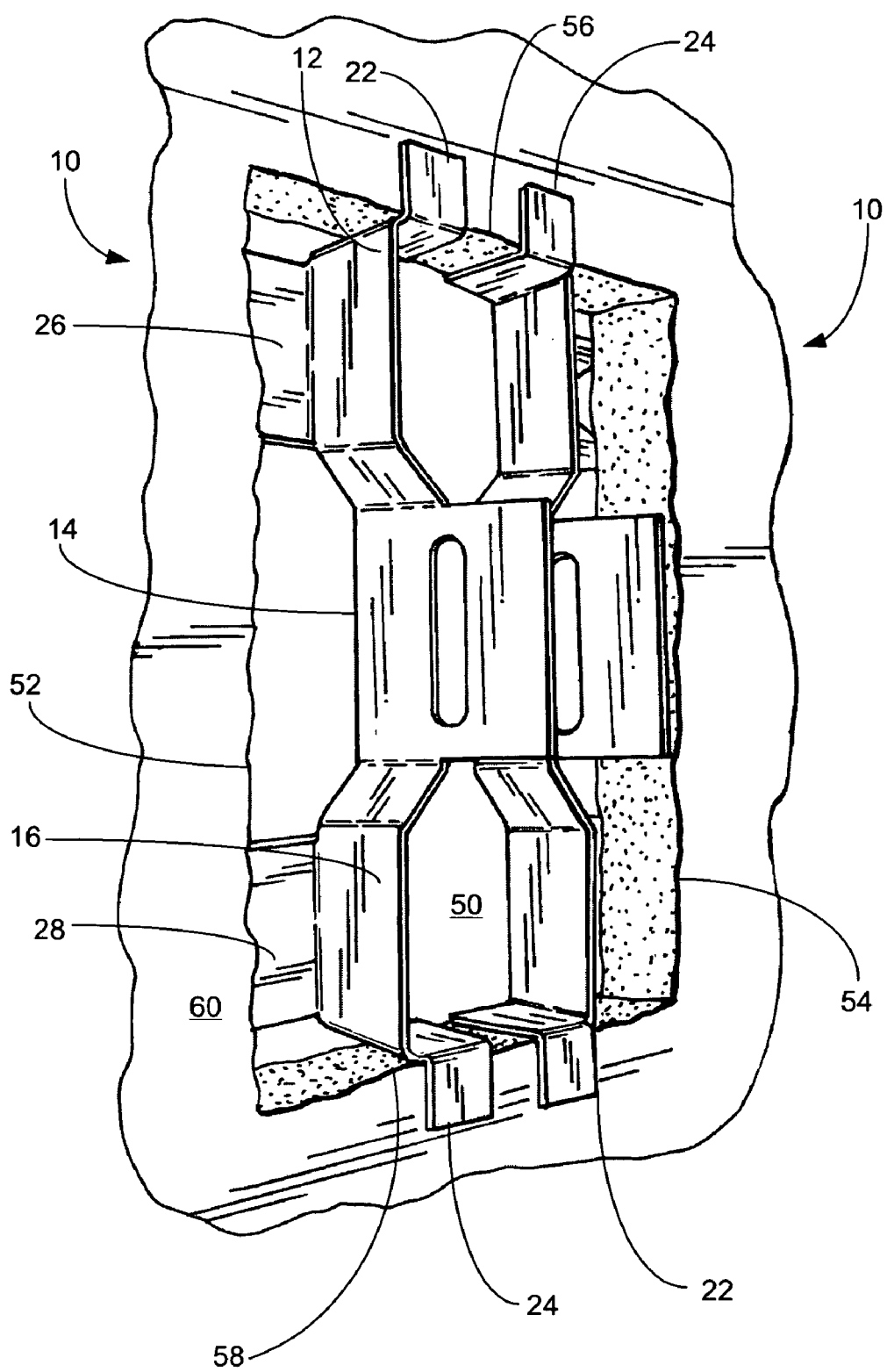
FIG. 9 shows a perspective view of a pair of rework brackets after insertion through an opening.

FIG. 9 shows a perspective view of a pair of rework brackets 10 after insertion into the opening 50 in the wall 60. The surfaces of the middle sections 14 and the end sections 12, 16 of the brackets 10 are substantially parallel to the vertical edges 52, 54 of the opening 50. The legs 26, 28 pass through the opening 50 and beyond the interior surface of the wall 60. The brackets 10 are then moved in opposing directions so that the legs 26, 28 contact the back side of the wall 60. The tabs 22, 24 are positioned flat against the exterior/front surface of the wall 60 above and below the top and bottom edges 56, 58 of the opening 50.

Figure 10:
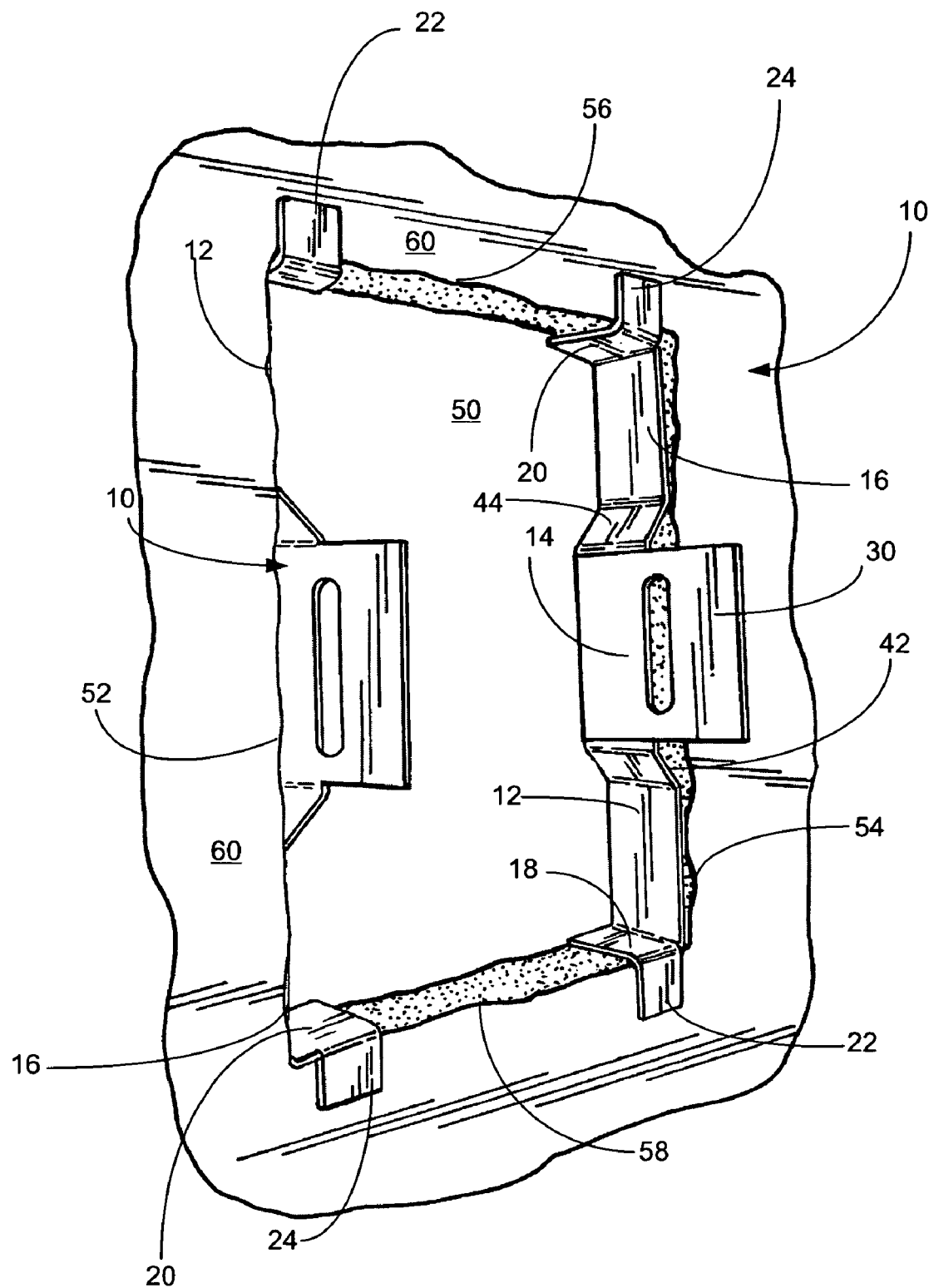
FIG. 10 shows a side view of a pair of rework brackets after they are inserted through an opening and moved laterally to contact the opposing edges of the opening.

FIG. 10 shows a side view of a pair of rework brackets 10 after they are inserted into the opening 50 and moved laterally to contact the opposing edges 52, 54 of the opening 50. The legs 26, 28 (see FIG. 9) are behind and in contact with the interior surface of the wall 60 and the two end sections 12, 16 contact the opposing vertical edges 52, 54 of the opening 50. An electrical outlet box 100 (see FIG. 14) can then be inserted between the brackets 10 and into the opening 50 so that the exterior side walls of the outlet box contact the middle sections 14 of the brackets 10. The brackets 10 with the offset middle sections 14 are flexible and engage the exterior walls of the outlet box 100 to secure it in the wall opening 50. Once the outlet box 100 (see FIG. 13) is in place, the bendable members 30 are folded over into the box 100 to further secure the box 100 in the opening 50 in the wall 60.

Figure 11:
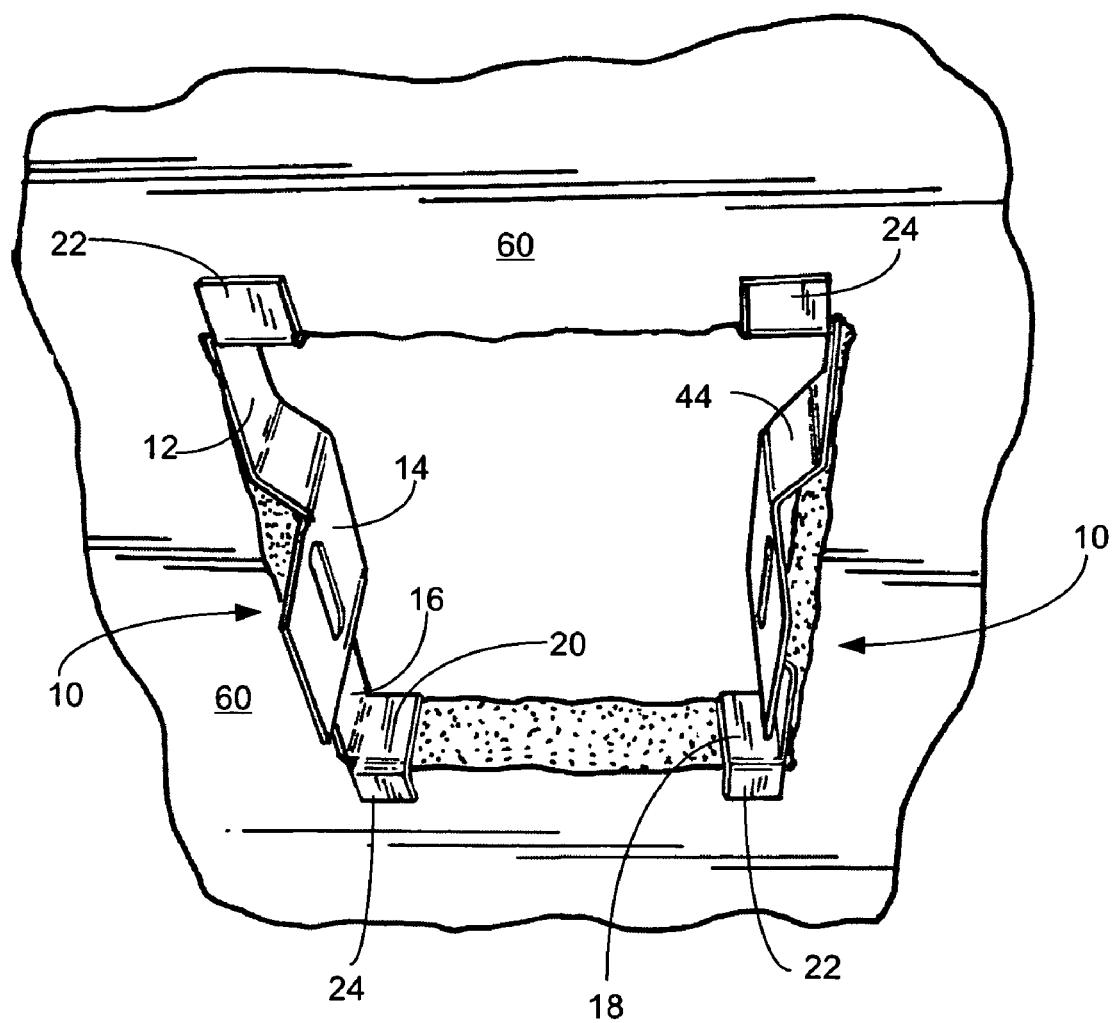
FIG. 11 shows a top perspective view of a pair of rework brackets after they are inserted through an opening in the wall and moved laterally to contact the opposing edges of the opening as viewed from front the wall.
Figure 12:
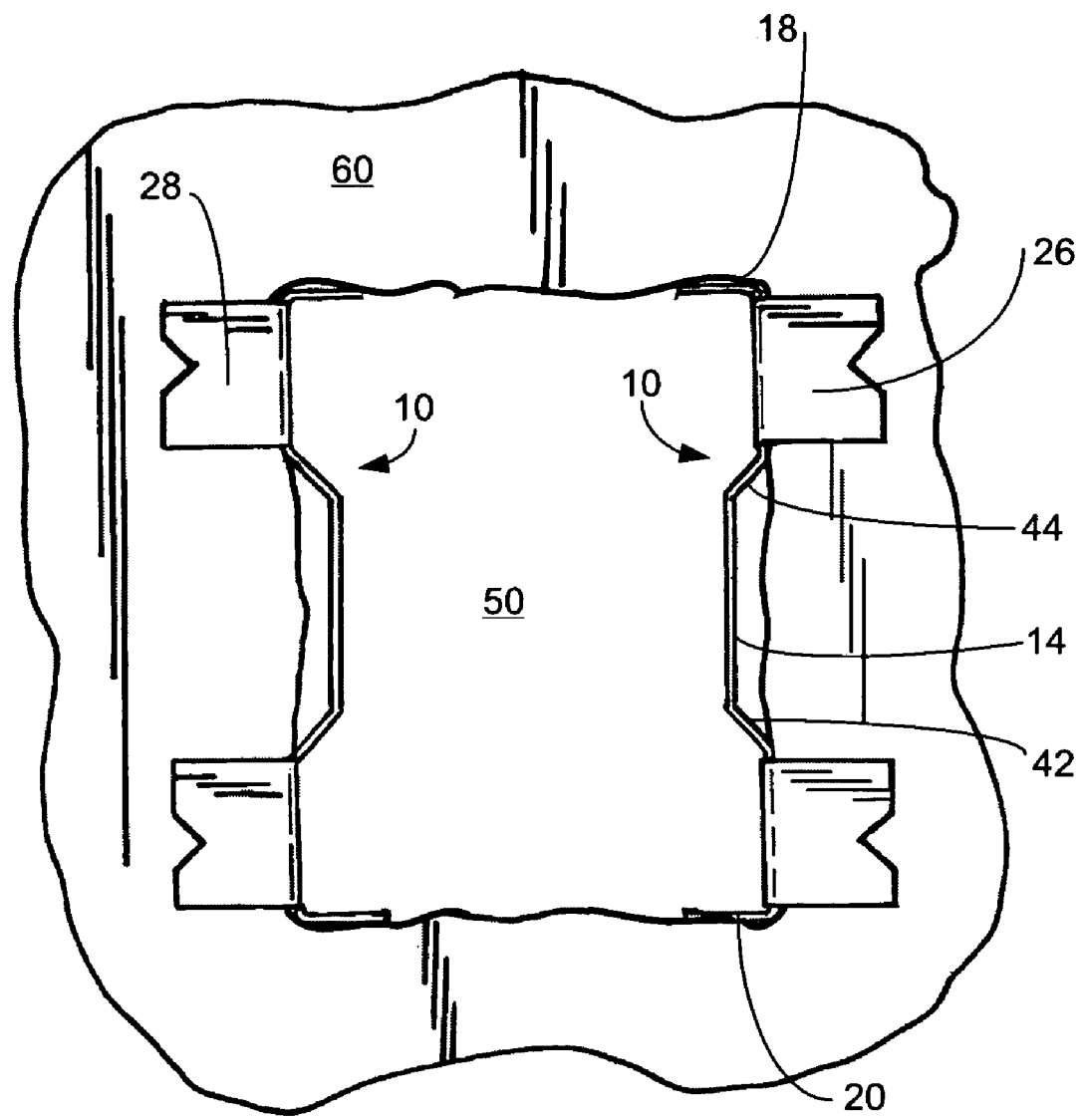
FIG. 12 shows a pair of rework brackets in their installed position in an opening as viewed from behind the wall.

FIGS. 11 and 12 show the pair of rework brackets 10 after they are installed and before the electrical outlet box is inserted in the wall opening 50. The offset portions 42, 44 act like a spring to provide flexibility when the outlet box 100 is inserted (see FIG. 13) and to ensure a snug fit. The tabs 22, 24 (FIG. 11) engage the exterior/front surface of the wall 60 and prevent the outlet box 100 from falling through the opening 50. The legs 26, 28 (FIG. 12) contact the interior/back surface of the wall 60 to hold the brackets 10 in position.

Figure 13:
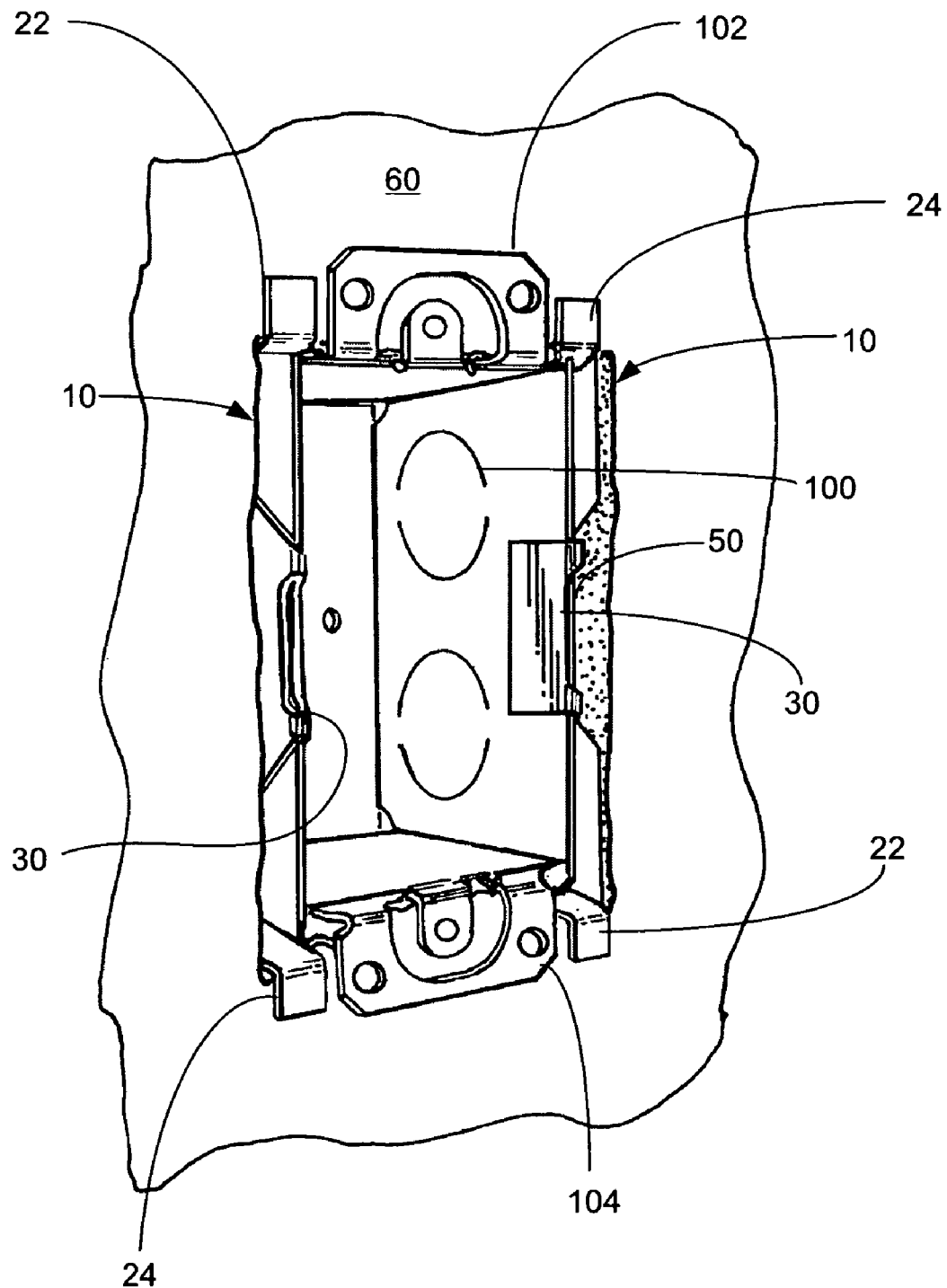
FIG. 13 shows a perspective view of a completed installation of an electrical outlet box secured in place by a pair of rework brackets as viewed from front the wall.
Figure 14:
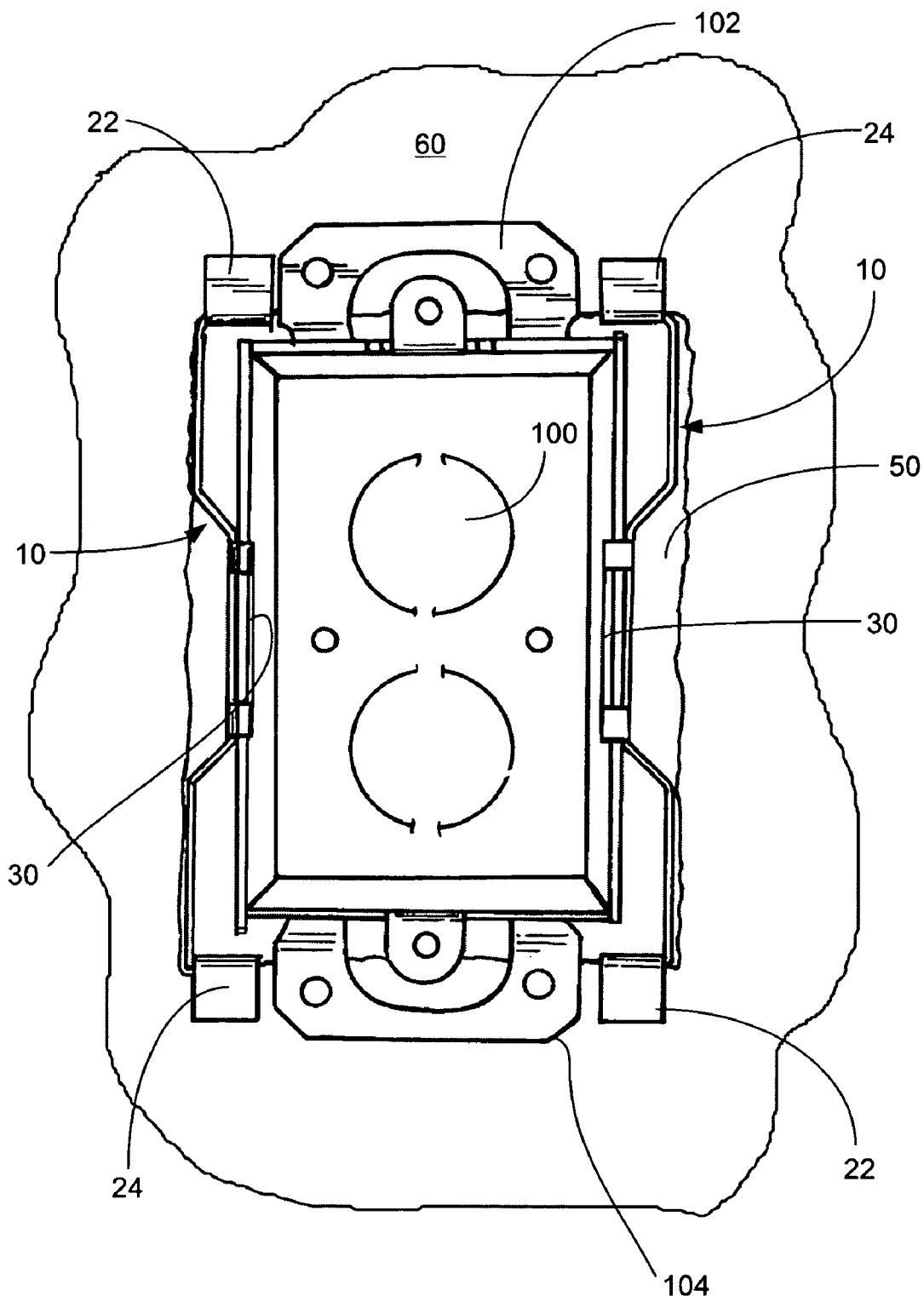
FIG. 14 shows a view of the installation as shown in FIG. 13 as viewed from front the wall.

FIGS. 13 and 14 illustrate a completed installation of an electrical outlet box 100 secured in an opening 50 in a wall 60 by a pair of rework brackets 10. Once the electrical outlet box 100 is placed within the opening 50, the bendable members 30 extending from the middle sections 14 of each of the brackets 10 are folded over the side edges of the outlet box 100. The top and bottom flanges 102, 104 of the outlet box 100 prevent the box 100 from falling into the opening 50 and the folded bendable members 30 prevent the box 100 from being removed from the opening 50.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A bracket for an electrical outlet box comprising:
   a first end section, a middle section and a second end section, wherein each section has a top surface and a first side and a second side, and wherein the end sections are substantially planar and the top surface of the middle section is offset upwardly from the top surfaces of the end sections;
   first and second opposing ends extending upwardly from the top surfaces of the first and second end sections in the same direction as the middle section is offset and substantially perpendicular to the first and second end sections, respectively, wherein the opposing ends have first and second sides which correspond to the first and second sides of the first, second and middle sections;
   a first tab and a second tab extending in opposing relation to each other from the first side of the first and second ends; and
   a first leg and a second leg extending downwardly from the second side of the first and second end sections to a first and a second bottom edge, respectively.

2. The bracket for an electrical outlet box according to claim 1, further comprising a bendable member extending from the first side of the middle section.

3. The bracket for an electrical outlet box according to claim 1, wherein the middle section is offset from the top surfaces of the first and second end sections.

4. The bracket for an electrical outlet box according to claim 3, further comprising a first offset portion and a second offset portion, wherein the middle section is substantially planar and is offset from the first end section by the first offset portion and from the second end section by the second offset portion.

5. The bracket for an electrical outlet box according to claim 1, wherein the surfaces of the first and second end sections are in substantially the same plane.

6. The bracket for an electrical outlet box according to claim 1, wherein the first and second legs are substantially flat.

7. The bracket for an electrical outlet box according to claim 5, wherein each of the first and second bottom edges comprises a notch.

8. The bracket for an electrical outlet box according to claim 1, wherein the first and second end sections have a first and a second length, respectively, and wherein the first and second legs extend downwardly along more than one half of the first and second lengths.

9. The bracket for an electrical outlet box according to claim 2, wherein the bendable member has an aperture.

10. The bracket for an electrical outlet box according to claim 1, wherein the bracket is made from non-ferrous or steel sheet metal.

11. The bracket for an electrical outlet box according to claim 4, wherein the middle section is substantially parallel to the first and second end sections.

12. The bracket for an electrical outlet box according to claim 1, further comprising a bendable member extending outwardly from the first side of the middle section.

13. A bracket for an electrical outlet box comprising:
   a first end section, a middle section and a second end section, wherein each section has a first side, a second side, a top surface and a bottom surface, wherein the end sections are substantially planar, and wherein the top surface of the middle section is offset upwardly from the top surfaces of the first and second end sections;

first and second opposing ends extending upwardly from the top surfaces of the first and second end sections in the same direction as the middle section is offset and substantially perpendicular to the top surfaces of the first and second end sections, respectively, wherein the opposing ends have first and second sides which correspond to the first and second sides of the first, second and middle sections;

a first tab and a second tab extending in opposing relation to each other from the first side of the first and second ends;

a first leg and a second leg extending downwardly from the second side of the bottom surfaces of the first and second end sections to a first and a second bottom edge, respectively; and a bendable member extending from the first side of the middle section.

14. The bracket for an electrical outlet box according to claim 13, wherein the bendable member has an aperture.

15. The bracket for an electrical outlet box according to claim 13, further comprising a first offset portion and a second offset portion, wherein the middle section is substantially planar and is offset from the first end section by the first offset portion and from the second end section by the second offset portion.

16. The bracket for an electrical outlet box according to claim 13, wherein the surfaces of the first and second end sections are in substantially the same plane.

17. The bracket for an electrical outlet box according to claim 13, wherein the first and second legs are substantially flat.

18. The bracket for an electrical outlet box according to claim 17, wherein each of the first and second bottom edges comprises a notch.

19. The bracket for an electrical outlet box according to claim 13, wherein the first and second end sections have a first and a second length, respectively, and wherein the first and second legs extend downwardly along more than one half of the first and second lengths.

20. The bracket for an electrical outlet box according to claim 13, wherein the bracket is made from non-ferrous or steel sheet metal.

21. The bracket for an electrical outlet box according to claim 15, wherein the middle section is substantially parallel to the first and second end sections.

22. A bracket for an electrical outlet box comprising:

a first end section, a middle section and a second end section, wherein each section has a first side, a second side, a top surface and a bottom surface, wherein the end sections are substantially planar, and wherein the top surface of the middle section is offset upwardly from the top surfaces of the first and second end sections;

a first offset portion and a second offset portion, wherein the middle section is substantially planar and is offset from the first end section by the first offset portion and from the second end section by the second offset portion;

first and second opposing ends extending upwardly and substantially perpendicular to the top surfaces of the first and second end sections, respectively, in the same direction as the middle section is offset, wherein the opposing ends have first and second sides which correspond to the first and second sides of the first, second and middle sections;

a first tab and a second tab extending in opposing relation to each other from the first side of the first and second ends;

a first leg and a second leg extending downwardly from the second side of the bottom surfaces of the first and second end sections to a first and a second bottom edge, respectively; and a bendable member extending from the first side of the middle section, wherein the bendable member has an aperture.

23. The bracket for an electrical outlet box according to claim 22, wherein the first and second legs are substantially flat and wherein each of the first and second bottom edges comprises a notch.

24. The bracket for an electrical outlet box according to claim 22, wherein the bracket is made from non-ferrous or steel sheet metal.

25. The bracket for an electrical outlet box according to claim 22, wherein the middle section is substantially parallel to the first and second end sections.

* * * * *